US012638570B2

(12) United States Patent
Liu et al.

(10) Patent No.: US 12,638,570 B2
(45) Date of Patent: May 26, 2026

(54) CONSIDERATIONS ON RESOURCE ALLOCATION ENHANCEMENTS FOR FREQUENCY-MODULATED CONTINUOUS-WAVE CONFIGURATION

(71) Applicant: QUALCOMM Incorporated, San Diego, CA (US)

(72) Inventors: Kangqi Liu, San Diego, CA (US); Weimin Duan, San Diego, CA (US); Shijun Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 18/605,684

(22) Filed: Mar. 14, 2024

(65) Prior Publication Data
US 2025/0291044 A1    Sep. 18, 2025

(51) Int. Cl.
*G01S 13/34* (2006.01)

(52) U.S. Cl.
CPC ................................. *G01S 13/343* (2013.01)

(58) Field of Classification Search
CPC .......... G01S 13/343; G01S 7/35; G01S 7/006; G01S 13/003; G01S 13/34
See application file for complete search history.

(56) References Cited

U.S. PATENT DOCUMENTS

2023/0171128 A1* 6/2023 Hwang .................. H04L 5/0007
2023/0350045 A1* 11/2023 Yerramalli ............ G01S 13/536
2024/0073072 A1* 2/2024 Duan ..................... H04B 17/30

FOREIGN PATENT DOCUMENTS

WO    2024025639 A1    2/2024

OTHER PUBLICATIONS

International Search Report and Written Opinion—PCT/US2025/014657—ISA/EPO—May 8, 2025.

* cited by examiner

*Primary Examiner* — William Kelleher
*Assistant Examiner* — Juliana Cross
(74) *Attorney, Agent, or Firm* — Weaver Austin Villeneuve & Sampson LLP

(57)                    ABSTRACT

An example method for radio frequency sensing using Frequency-Modulated Continuous-Wave signals performed by a configuring device, the method may comprise determining a plurality of resource elements that are consecutive in frequency. The plurality of resource elements may comprise a starting resource element located at a first end of the plurality of resource elements and an ending resource element located at a second end of the plurality of resource elements. The method may also comprise quantizing the starting resource element into a first plurality of frequency values, quantizing the ending resource element into a second plurality of frequency values, determining a first configuration of a first FMCW signal such that the first FMCW signal linearly changes frequency between a starting frequency value of the first plurality of frequency values and an ending frequency value of the second plurality of frequency values, and transmitting a configuration message indicating the first configuration.

30 Claims, 11 Drawing Sheets

Time

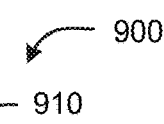

900

910 obtaining a first configuration for a first FMCW signal, wherein according to the first configuration, the first FMCW signal extends across a plurality of resource elements of a wireless communication scheme that are consecutive in frequency, the plurality of resource elements comprising: a starting resource element located at a first end of the plurality of resource elements; and an ending resource element located at a second end of the plurality of resource elements, wherein the starting resource element is quantized into a first plurality of frequency values, the ending resource element is quantized into a second plurality of frequency values, and the first FMCW signal linearly changes frequency between a starting frequency value of the first plurality of frequency values and an ending frequency value of the second plurality of frequency values

920 performing the RF sensing according to the first configuration

FIG. 9

CONSIDERATIONS ON RESOURCE ALLOCATION ENHANCEMENTS FOR FREQUENCY-MODULATED CONTINUOUS-WAVE CONFIGURATION

TECHNICAL FIELD

The present disclosure relates generally to the field of radio frequency (RF)-based sensing in a wireless network and more specifically relates to a method of configuring Frequency-Modulated Continuous-Wave (FMCW) signals for joint communication and sensing (JCS).

BACKGROUND

As the bandwidth allocated for cellular communication systems, such as 5G and its advanced iteration 5G+, expands to accommodate a growing number of use cases, the integration of communication with radio frequency (RF) sensing becomes widely used. In Joint Communication and RF Sensing (JCS), an integrated system is capable of concurrently performing wireless communications and remote radar sensing. This dual functionality not only streamlines the deployment process but also ensures a cost-efficient utilization of resources. Furthermore, such integrated systems are designed to effectively allocate time, frequency, and spatial radio resources to support both communication and sensing purposes. Frequency-Modulated Continuous-Wave (FMCW) signals are widely used in radar systems due to their low complexity and cost. The FMCW signals can be repurposed for multiple functions, including sensing, positioning, and communications within JCS frameworks, among others.

BRIEF SUMMARY

An example method for radio frequency (RF) sensing using Frequency-Modulated Continuous-Wave (FMCW) signals performed by a configuring device, the method may comprise determining a plurality of resource elements of a wireless communication scheme that are consecutive in frequency. The plurality of resource elements may comprise a starting resource element located at a first end of the plurality of resource elements and an ending resource element located at a second end of the plurality of resource elements. The method may also comprise quantizing the starting resource element into a first plurality of frequency values and quantizing the ending resource element into a second plurality of frequency values. The method may further comprise determining a first configuration of a first FMCW signal such that the first FMCW signal linearly changes frequency between a starting frequency value of the first plurality of frequency values and an ending frequency value of the second plurality of frequency values and transmitting a configuration message indicating the first configuration.

An example method for radio frequency (RF) sensing using Frequency-Modulated Continuous-Wave (FMCW) signals performed by a sensing device, the method may comprise obtaining a first configuration for a first FMCW signal, wherein according to the first configuration, the first FMCW signal extends across a plurality of resource elements of a wireless communication scheme that are consecutive in frequency. The plurality of resource elements may comprise a starting resource element located at a first end of the plurality of resource elements and an ending resource element located at a second end of the plurality of resource elements. The starting resource element may be quantized into a first plurality of frequency values, the ending resource element may be quantized into a second plurality of frequency values, and the first FMCW signal may linearly change frequency between a starting frequency value of the first plurality of frequency values and an ending frequency value of the second plurality of frequency values. The method may further comprise performing the RF sensing according to the first configuration.

An example configuring device for integrated sensing and communication may comprise one or more transceivers, one or more memories, and one or more processors communicatively coupled with the one or more transceivers and the one or more memories. The one or more processors may be configured to determine a plurality of resource elements of a wireless communication scheme that are consecutive in frequency. The plurality of resource elements may comprise a starting resource element located at a first end of the plurality of resource elements and an ending resource element located at a second end of the plurality of resource elements. The one or more processors may further be configured to quantize the starting resource element into a first plurality of frequency values and quantize the ending resource element into a second plurality of frequency values. The one or more processors may also be configured to determine a first configuration of a first FMCW signal such that the first FMCW signal linearly changes frequency between a starting frequency value of the first plurality of frequency values and an ending frequency value of the second plurality of frequency values, and transmit a configuration message indicating the first configuration.

An example sensing device for integrated sensing and communication may comprise one or more transceivers, one or more memories, and one or more processors communicatively coupled with the one or more transceivers and the one or more memories. The one or more processors may be configured to obtain a first configuration for a first FMCW signal, wherein according to the first configuration, the first FMCW signal extends across a plurality of resource elements of a wireless communication scheme that are consecutive in frequency. The plurality of resource elements may comprise a starting resource element located at a first end of the plurality of resource elements and an ending resource element located at a second end of the plurality of resource elements. The starting resource element is quantized into a first plurality of frequency values, the ending resource element is quantized into a second plurality of frequency values, and the first FMCW signal linearly changes frequency between a starting frequency value of the first plurality of frequency values and an ending frequency value of the second plurality of frequency values. The one or more processors may further be configured to perform the RF sensing according to the first configuration.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 9 is a flow diagram of a method of RF sensing using FMCW signals, performed by a sensing device, according to some embodiments.

Figure 1:
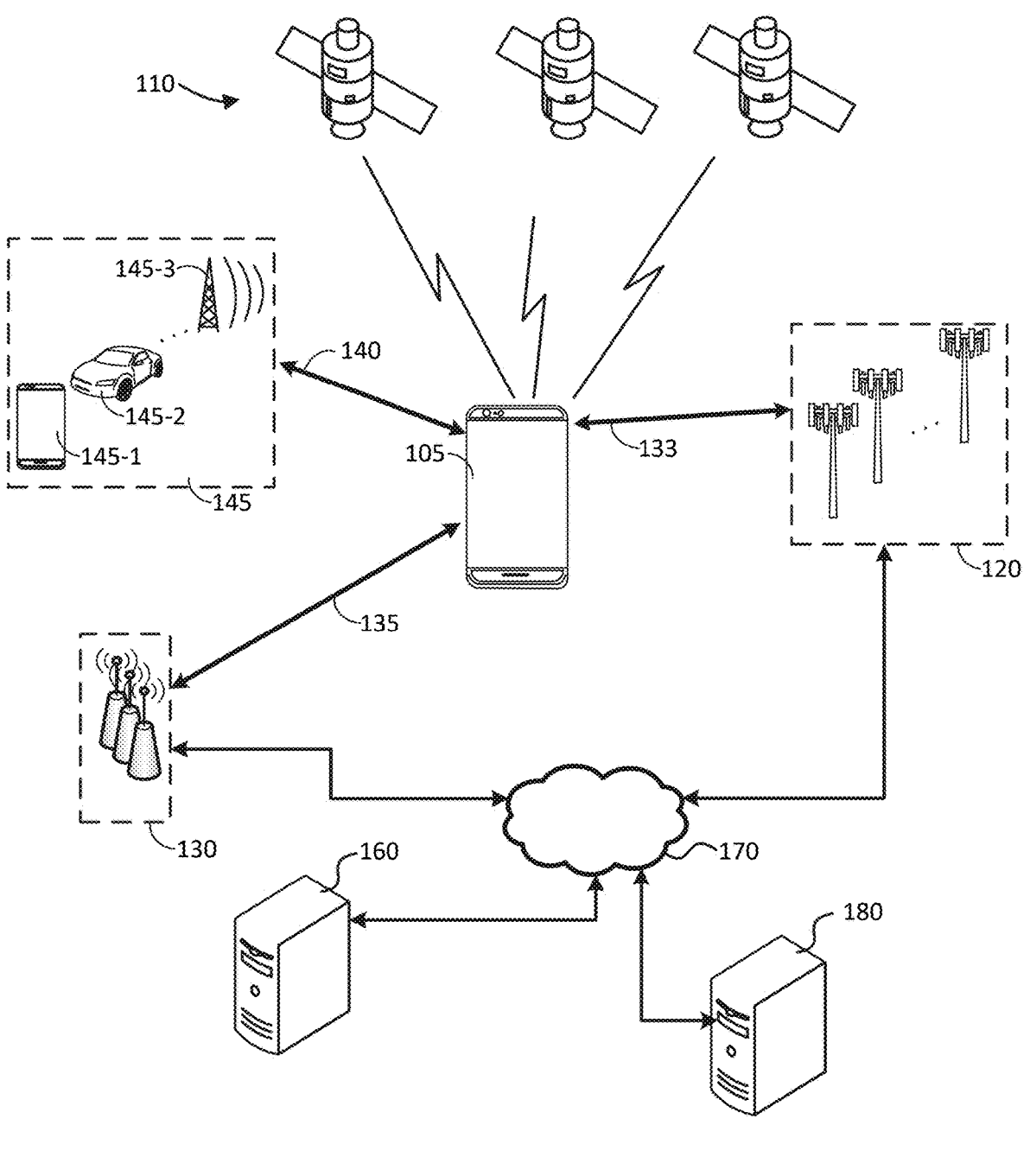
FIG. 1 is an illustration of a communication/positioning/sensing system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

As used herein, the terms "RF sensing," "passive RF sensing," and variants refer to a process by which one or more objects are detected using RF signals transmitted by a transmitting device and, after reflecting from the one or more objects, received by a receiving device. In a monostatic configuration, the transmitting and receiving device are the same device. In multi-static configuration, one or more receiving devices are separate from one or more transmitting devices. As described hereafter in more detail, a receiving device can make measurements of these reflected RF signals to determine one or more characteristics of the one or more objects, such as location, angle, direction, orientation, Doppler, velocity, etc. According to some embodiments, RF sensing may be "passive" in that no RF signals need to be transmitted by the receiving device or one or more objects for the one or more objects to be detected.

Additionally, unless otherwise specified, references to "sensing signals," "RF sensing signals," "reference signals," "sensing reference signals," "reference signals for sensing," and the like may be used to refer to signals used for sensing for a user equipment (UE). As described in more detail herein, such signals may comprise any of a variety of signal types but may not necessarily be limited to a Positioning Reference Signal (PRS) as defined in relevant wireless standards.

Techniques provided herein can apply generally to "mmWave" technologies, which typically operate at 57-71 GHz, but may include frequencies ranging from 30-300 GHz. This includes, for example, frequencies utilized by the 802.11ad Wi-Fi standard (operating at 60 GHz). That said, some embodiments may utilize RF sensing with frequencies outside this range. For example, in some embodiments, 5G NR frequency bands (e.g., 28 GHz) may be used. Because RF sensing may be performed in the same bands as communication, hardware may be utilized for both communication and RF sensing. For example, one or more of the components of an RF sensing system as described herein may be included in a wireless modem (e.g., Wi-Fi or NR modem), a UE (e.g., an extended device), or the like. Additionally, techniques may apply to RF signals comprising any of a variety of pulse types, including compressed pulses (e.g., comprising Chirp, Golay, Barker, or Ipatov sequences) may be utilized. That said, embodiments are not limited to such frequencies and/or pulse types. Additionally, because the RF sensing system may be capable of sending RF signals for communication (e.g., using 802.11 or NR wireless technology), embodiments may leverage channel estimation and/or other communication-related functions for providing RF sensing functionality as described herein. Accordingly, the pulses may be the same as those used in at least some aspects of wireless communication.

Various aspects relate generally to the field of RF-based sensing in a wireless network and more specifically relates to a method of configuring FMCW signals for JCS. In some embodiments, a plurality of resource elements of a wireless communication scheme (e.g., an Orthogonal Frequency Division Multiplexing (OFDM) communication scheme) that are consecutive in frequency may be determined. The plurality of resource elements may include a starting and an ending resource element, located at the respective ends of the plurality of resource elements. The starting resource element and the ending resource element may each be quantized into a plurality of frequency values. A FMCW signal linearly changing frequency from a starting frequency value of the starting resource element to an ending frequency value of the ending resource element, may be configured. A sensing device may then be configured to perform the RF sensing using the first FMCW signal.

Particular aspects of the subject matter described in this disclosure can be implemented to achieve the following potential advantages: compared to existing techniques, which may indicate resource allocation resolution only at the resource element level, quantizing the resource elements configured for RF sensing allows for a higher resolution sensing resource allocation for FMCW signals. This enhancement can further increase the efficiency of the JCS.

FIG. 1 is a simplified illustration of a wireless system capable of communication, positioning, and sensing, referred to herein as a "communication/positioning/sensing system" 100 in which a mobile device 105, network function server 160, and/or other components of the communication/positioning/sensing system 100 can use the techniques provided herein for JCS, according to an embodiment. (That said, embodiments are not necessarily limited to such a system.) The techniques described herein may be implemented by one or more components of the communication/positioning/sensing system 100. The communication/positioning/sensing system 100 can include: a mobile device 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and or Non-Terrestrial Network (NTN) satellites; base stations 120; access points (APs) 130; network function server 160; network 170; and external client 180. Generally put, the communication/positioning/sensing system 100 may be capable of enabling communication between the mobile device 105 and other devices, positioning of the mobile device 105 and/or other devices, performing RF sensing by the mobile device 105 and/or other devices, or a combination thereof. For example, the communication/positioning/sensing system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additionally or alternatively, wireless devices such as the mobile device 105, base stations 120, and satellites 110 (and/or other NTN platforms, which may be implemented on airplanes, drones, balloons, etc.) can be utilized to perform positioning (e.g., of one or more wireless devices) and/or perform RF sensing (e.g., of one or more objects by using RF signals transmitted by one or more wireless devices).

It should be noted that FIG. 1 provides only a generalized illustration of various components, any or all of which may be utilized as appropriate, and each of which may be duplicated as necessary. Specifically, although only one mobile device 105 is illustrated, it will be understood that many UEs (e.g., hundreds, thousands, millions, etc.) may utilize the communication/positioning/sensing system 100. Similarly, the communication/positioning/sensing system 100 may include a larger or smaller number of base stations 120 and/or APs 130 than illustrated in FIG. 1. The illustrated connections that connect the various components in the communication/positioning/sensing system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to network function server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). In and LTE, 5G, or other cellular network, mobile device 105 may be referred to as a user equipment (UE). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as network function server 160, by accessing the network 170 via a base station 120 using a first communication link 133. Additionally or alternatively, because APs 130 also may be communicatively coupled with the network 170, mobile device 105 may communicate with network-connected and Internet-connected devices, including network function server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). According to aspects of applicable 5G cellular standards, a base station 120 (e.g., gNB) may be capable of transmitting different "beams" in different directions and performing "beam sweeping" in which a signal is transmitted in different beams, along different directions (e.g., one after the other). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

Satellites 110 may be utilized for positioning in communication in one or more way. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120 and may be coordinated by a network function server 160, which may operate as a location server. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites. NTN satellites 110 and/or other NTN platforms may be further leveraged to perform RF sensing. As described in more detail hereafter, satellites may use a JCS symbol in an Orthogonal Frequency-Division Multiplexing (OFDM) waveform to allow both RF sensing and/or positioning, and communication.

The network function server 160 may comprise one or more servers and/or other computing devices configured to provide a network-managed and/or network-assisted function, such as operating as a location server and/or sensing server. A location server, for example, may determine an estimated location of mobile device 105 and/or provide data (e.g., "assistance data") to mobile device 105 to facilitate location measurement and/or location determination by mobile device 105. According to some embodiments, a location server may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in the location server. In some embodiments, the location server may comprise, a Discovered SLP (D-SLP) or an Emergency SLP (E-SLP). The location server may also comprise an Enhanced Serving Mobile Location Center (E-SMLC) that supports location of mobile device 105 using a control plane (CP) location solution for LTE radio access by mobile device 105. The location server may further comprise a Location Management Function (LMF) that supports location of mobile device 105 using a control plane (CP) location solution for NR or LTE radio access by mobile device 105.

Similarly, the network function server 160, may function as a sensing server. A sensing server can be used to coordinate and/or assist in the coordination of sensing of one or more objects (also referred to herein as "targets") by one or more wireless devices in the communication/positioning/sensing system 100. This can include the mobile device 105, base stations 120, APs 130, other mobile devices 145, satellites 110, or any combination thereof. Wireless devices capable of performing RF sensing may be referred to herein as "sensing nodes." To perform RF sensing, a sensing server may coordinate sensing sessions in which one or more RF sensing nodes may perform RF sensing by transmitting RF signals (e.g., reference signals (RSs)), and measuring reflected signals, or "echoes," comprising reflections of the transmitted RF signals off of one or more objects/targets. Reflected signals and object/target detection may be determined, for example, from channel state information (CSI) received at a receiving device. Sensing may comprise (i) monostatic sensing using a single device as a transmitter (of RF signals) and receiver (of reflected signals); (ii) bistatic sensing using a first device as a transmitter and a second device as a receiver; or (iii) multi-static sensing using a plurality of transmitters and/or a plurality of receivers. To facilitate sensing (e.g., in a sensing session among one or more sensing nodes), a sensing server may provide data (e.g., "assistance data") to the sensing nodes to facilitate RS transmission and/or measurement, object/target detection, or any combination thereof. Such data may include an RS configuration indicating which resources (e.g., time and/or frequency resources) may be used (e.g., in a sensing session) to transmit RS for RF sensing. According to some embodiments, a sensing server may comprise a Sensing Management Function (SMF).

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the mobile device 105, such as infrared signals or other optical technologies.

An estimated location of mobile device 105 can be used in a variety of applications—e.g., to assist direction finding or navigation for a user of mobile device 105 or to assist another user (e.g., associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another UE) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g., including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g., a circle or ellipse) within which mobile device 105 is expected to be located with some level of confidence (e.g., 95% confidence).

The external client 180 may be a web server or remote application that may have some association with mobile device 105 (e.g., may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2:
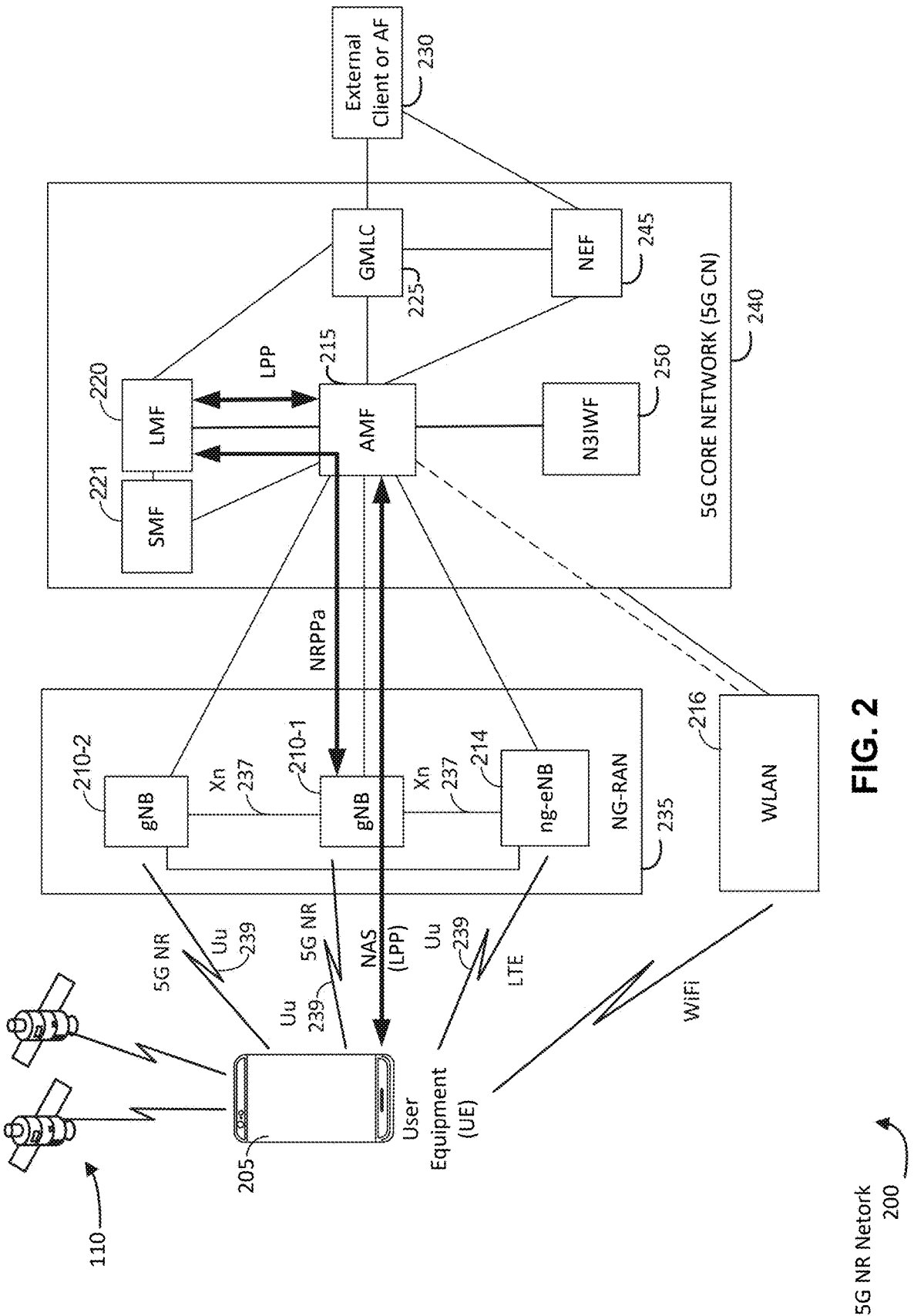
FIG. 2 is a diagram of a fifth-generation new radio (5G NR) network, according to an embodiment.

As previously noted, the example communication/positioning/sensing system 100 can be implemented using a wireless communication network, such as an LTE-based or 5G NR-based network, or a future 6G network. FIG. 2 shows a diagram of a 5G NR network 200, illustrating an embodiment of a wireless system (e.g., communication/positioning/sensing system 100) implemented in 5G NR. The 5G NR network 200 may be configured to enable wireless communication, determine the location of a UE 205

(which may correspond to the mobile device 105 of FIG. 1), perform RF sensing, perform the JCS disclosed herein, or a combination thereof, by using access nodes, which may include NR NodeB (gNB) 210-1 and 210-2 (collectively and generically referred to herein as gNBs 210), ng-eNB 214, and/or WLAN 216. These access nodes can use RF signaling to enable the communication, implement one or more positioning methods, and/or implement RF sensing. The gNBs 210 and/or the ng-eNB 214 may correspond with base stations 120 of FIG. 1, and the WLAN 216 may correspond with one or more access points 130 of FIG. 1. Optionally, the 5G NR network 200 additionally may be configured to determine the location of a UE 205 by using an LMF 220 (which may correspond with location server 160) to implement the one or more positioning methods. The SMF 221 may coordinate RF sensing by the 5G NR network 200. Here, the 5G NR network 200 comprises a UE 205, and components of a 5G NR network comprising a Next Generation (NG) Radio Access Network (RAN) (NG-RAN) 235 and a 5G Core Network (5G CN) 240. A 5G NR network 200 may also be called a 5G network and/or an NR network; NG-RAN 235 may be referred to as a 5G RAN or as an NR RAN; and 5G CN 240 may be referred to as an NG Core network. Additional components of the 5G NR network 200 are described below. The 5G NR network 200 may include additional or alternative components.

The 5G NR network 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 205 is illustrated, it will be understood that many UEs (e.g., hundreds, thousands, millions, etc.) may utilize the 5G NR network 200. Similarly, the 5G NR network 200 may include a larger (or smaller) number of satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR network 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 205 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 205 may correspond to a cellphone, smartphone, laptop, tablet, personal data assistant (PDA), navigation device, Internet of Things (IoT) device, or some other portable or moveable device. Typically, though not necessarily, the UE 205 may support wireless communication using one or more Radio Access Technologies (RATs) such as using GSM, CDMA, W-CDMA, LTE, High-Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 205 may also support communication using a WLAN 216 which (like the one or more RATs, and as previously noted with respect to FIG. 1) may connect to other networks, such as the Internet. The use of one or more of these RATs may allow the UE 205 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 205 (e.g., via the GMLC 225). The external client 230 of FIG. 2 may correspond to external client 180 of FIG. 1, as implemented in or communicatively coupled with a 5G NR network.

The UE 205 may include a single entity or may include multiple entities, such as in a personal area network where a user may employ audio, video and/or data I/O devices, and/or body sensors and a separate wireline or wireless modem. An estimate of a location of the UE 205 may be referred to as a location, location estimate, location fix, fix, position, position estimate, or position fix, and may be geodetic, thus providing location coordinates for the UE 205 (e.g., latitude and longitude), which may or may not include an altitude component (e.g., height above sea level, height above or depth below ground level, floor level or basement level). Alternatively, a location of the UE 205 may be expressed as a civic location (e.g., as a postal address or the designation of some point or small area in a building such as a particular room or floor). A location of the UE 205 may also be expressed as an area or volume (defined either geodetically or in civic form) within which the UE 205 is expected to be located with some probability or confidence level (e.g., 67%, 95%, etc.). A location of the UE 205 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 205 via wireless communication between the UE 205 and one or more of the gNBs 210, which may provide wireless communications access to the 5G CN 240 on behalf of the UE 205 using 5G NR. The wireless interface between base stations (gNBs 210 and/or ng-eNB 214) and the UE 205 may be referred to as a Uu interface 239. 5G NR radio access may also be referred to as NR radio access or as 5G radio access. In FIG. 2, the serving gNB for UE 205 is assumed to be gNB 210-1, although other gNBs (e.g. gNB 210-2) may act as a serving gNB if UE 205 moves to another location or may act as a secondary gNB to provide additional throughput and bandwidth to UE 205.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 205. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 205 but may not receive signals from UE 205 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 205. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR network 200, such as the LMF 220 and AMF 215.

5G NR network 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 205 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 205 to other elements in 5G CN 240 and/or may support interworking of one or more protocols used by WLAN 216 and UE 205 to one or more protocols used by other elements of 5G CN 240 such as AMF 215. For example, N3IWF 250 may support IPSec tunnel establishment with UE 205, termination of IKEv2/IPSec protocols with UE 205, termination of N2 and N3 interfaces to 5G CN 240 for control plane and user plane, respectively, relaying of uplink (UL) and downlink (DL) control plane Non-Access Stratum (NAS) signaling between UE 205 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 205 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR network 200), may be configured to, in response to receiving a request for location information from the LMF 220, obtain location measurements of uplink (UL) signals received from the UE 205) and/or obtain downlink (DL) location measurements from the UE 205 that were obtained by UE 205 for DL signals received by UE 205 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 205, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 205 may be applicable to such other networks.

The gNBs 210 and ng-eNB 214 can communicate with an AMF 215, which, for positioning functionality, communicates with an LMF 220. The AMF 215 may support mobility of the UE 205, including cell change and handover of UE 205 from an access node (e.g., gNB 210, ng-eNB 214, or WLAN 216) of a first RAT to an access node of a second RAT. The AMF 215 may also participate in supporting a signaling connection to the UE 205 and possibly data and voice bearers for the UE 205. The LMF 220 may support positioning of the UE 205 using a CP location solution when UE 205 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhanced Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 205, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 205's location) may be performed at the UE 205 (e.g., by measuring downlink PRS (DL-PRS) signals transmitted by wireless nodes such as gNBs 210, ng-eNB 214 and/or WLAN 216, and/or using assistance data provided to the UE 205, e.g., by LMF 220).

The Gateway Mobile Location Center (GMLC) 225 may support a location request for the UE 205 received from an external client 230 and may forward such a location request to the AMF 215 for forwarding by the AMF 215 to the LMF 220. A location response from the LMF 220 (e.g., containing a location estimate for the UE 205) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 205 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 205 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 205 may communicate using an LTE Positioning Protocol (LPP) as defined in 3GPP TS 37.355. Here, LPP messages may be transferred between the UE 205 and the LMF 220 via the AMF 215 and a serving gNB 210-1 or serving ng-eNB 214 for UE 205. For example, LPP messages may be transferred between the LMF 220 and the AMF 215 using messages for service-based operations (e.g., based on the Hypertext Transfer Protocol (HTTP)) and may be transferred between the AMF 215 and the UE 205 using a 5G NAS protocol. The LPP protocol may be used to support positioning of UE 205 using UE assisted and/or UE based position methods such as A-GNSS, RTK, TDOA, multi-cell RTT, AoD, and/or ECID. The NRPPa protocol may be used to support positioning of UE 205 using network-based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 205 access to WLAN 216, LMF 220 may use NRPPa and/or LPP to obtain a location of UE 205 in a similar manner to that just described for UE 205 access to a gNB 210 or ng-eNB 214. Thus, NRPPa messages may be transferred between a WLAN 216 and the LMF 220, via the AMF 215 and N3IWF 250 to support network-based positioning of UE 205 and/or transfer of other location information from WLAN 216 to LMF 220. Alternatively, NRPPa messages may be transferred between N3IWF 250 and the LMF 220, via the AMF 215, to support network-based positioning of UE 205 based on location related information and/or location measurements known to or accessible to N3IWF 250 and transferred from N3IWF 250 to LMF 220 using NRPPa. Similarly, LPP and/or LPP messages may be transferred between the UE 205 and the LMF 220 via the AMF 215, N3IWF 250, and serving WLAN 216 for UE 205 to support UE assisted or UE based positioning of UE 205 by LMF 220.

Figure 3:
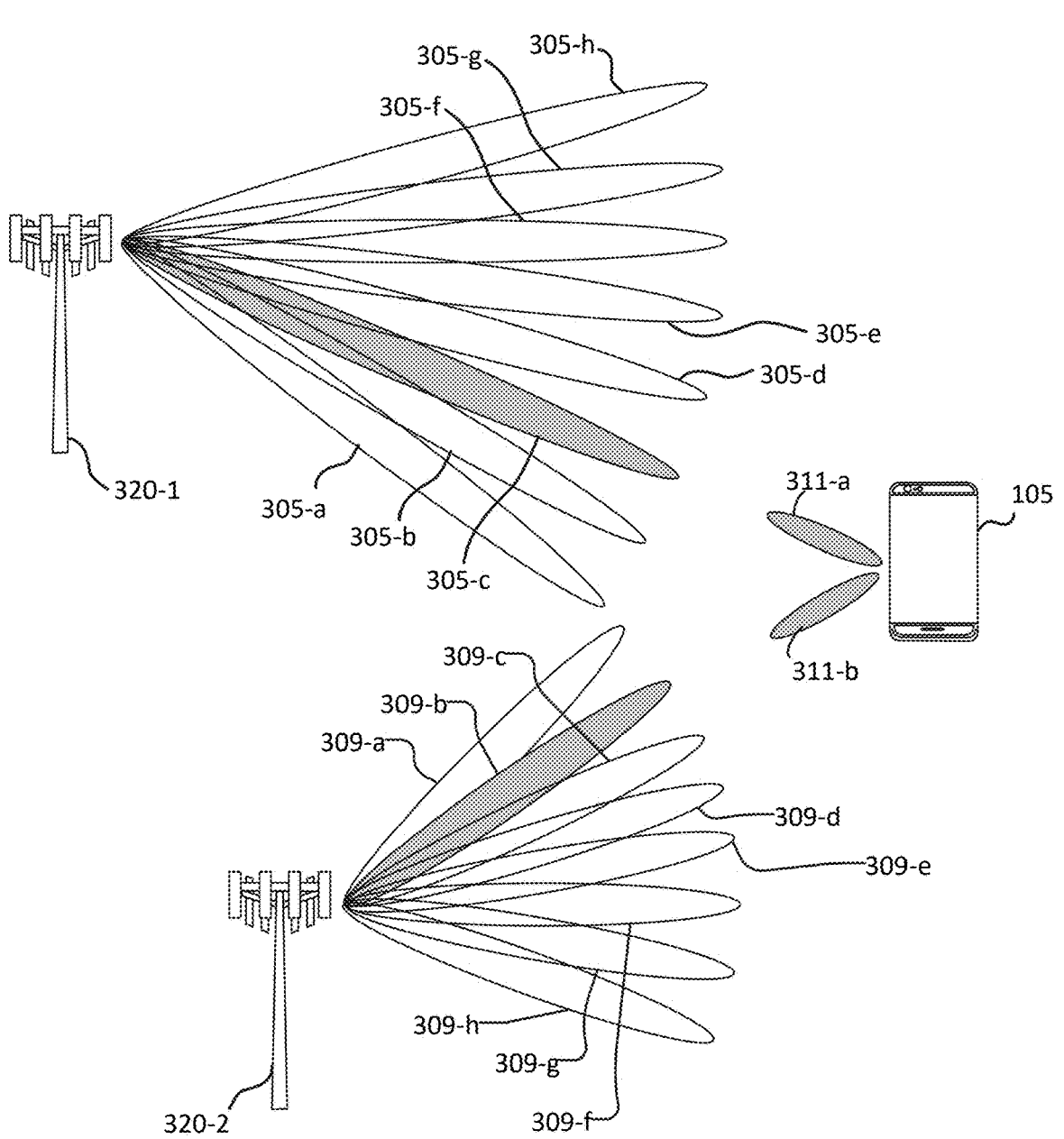
FIG. 3 is a diagram showing an example of how beamforming may be performed, according to some embodiments.

FIG. 3 is a diagram illustrating a simplified environment 300 including two base stations 320-1 and 320-2 (which may correspond to base stations 120 of FIG. 1 and/or gNBs 210 and/or ng-eNB 214 of FIG. 2) with antenna arrays that can perform beamforming to produce directional beams for transmitting and/or receiving RF signals. FIG. 3 also illustrates a UE 105, which may also use beamforming for transmitting and/or receiving RF signals. Such directional beams are used in 5G NR wireless communication networks. Each directional beam may have a beam width centered in a different direction, enabling different beams of a base station 320 to correspond with different areas within a coverage area for the base station 320.

Different modes of operation may enable base stations 320-1 and 320-2 to use a larger or smaller number of beams. For example, in a first mode of operation, a base station 320 may use 16 beams, in which case each beam may have a relatively wide beam width. In a second mode of operation, a base station 320 may use 64 beams, in which case each beam may have a relatively narrow beam width. Depending on the capabilities of a base station 320, the base station may use any number of beams the base station 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, the UE 105 may be capable of using different numbers of beams, which may also correspond to different modes of operation, signal types, etc.

In some situations, a base station 320 may use beam sweeping. Beam sweeping is a process in which the base station 320 may send an RF signal in different directions using different respective beams, often in succession, effectively "sweeping" across a coverage area. For example, a base station 320 may sweep across 120 or 360 degrees in an azimuth direction, for each beam sweep, which may be periodically repeated. Each direction beam can include an RF reference signal (e.g., a PRS resource), where base station 320-1 produces a set of RF reference signals that includes Tx beams 305-a, 305-b, 305-c, 305-d, 305-e, 305-f, 305-g, and 305-h, and the base station 320-2 produces a set of RF reference signals that includes Tx beams 309-a, 309-b, 309-c, 309-d, 309-e, 309-f, 309-g, and 309-h. As noted, because UE 105 may also include an antenna array, it can receive RF reference signals transmitted by base stations 320-1 and 320-2 using beamforming to form respective receive beams (Rx beams) 311-a and 311-b. Beamforming in this manner (by base stations 320 and optionally by UEs 105) can be used to make communications more efficient. They can also be used for other purposes, including taking measurements for position determination (e.g., AoD and AoA measurements).

Figure 4:
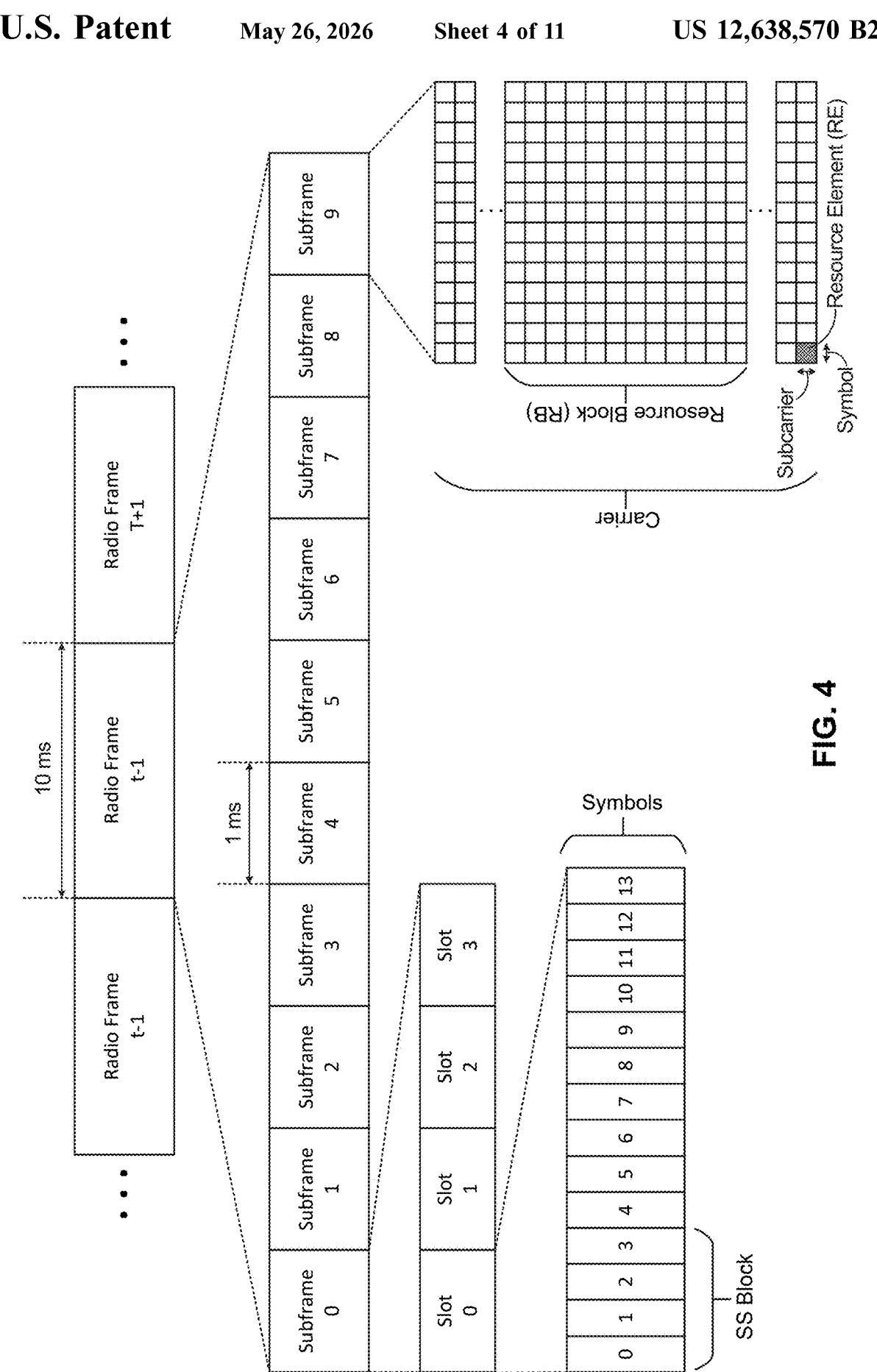
FIG. 4 is a diagram showing an example of a frame structure for NR and associated terminology.

FIG. 4 is a diagram showing an example of a frame structure for NR and associated terminology, which can serve as the basis for physical layer communication between the UE 105 and base stations/TRPs. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols)

depending on the subcarrier spacing. The symbol periods in each slot may be assigned indices. A mini slot may comprise a sub slot structure (e.g., 2, 3, or 4 symbols). Additionally shown in FIG. 4 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 4. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

As noted above, JCS where the system is capable of concurrently performing wireless communications and remote radar sensing are widely used in wireless networks. FMCW signals are widely used in radar systems due to their simplicity and cost-effectiveness. The FMCW signals can be repurposed for a variety of applications, including sensing, positioning, communication, and JCS. Compatible with OFDM communication schemes, FMCW signals may be generated using a Voltage-Controlled Oscillator (VCO) or by employing a Discrete Fourier Transform-spread (DFT-s) OFDM transmitter diagram.

In applications where FMCW is employed for bi-static sensing or communication, the Rx may need to generate its own FMCW signal. This locally generated signal is then mixed with incoming signals to extract the beat frequency for subsequent signal processing.

The existing resource allocation schemes present the UE, whether functioning as a transmitter Tx or Rx, with resolution information that could be at the Resource Element (RE)-level, the Resource Block (RB)-level, or the Resource Block Group (RBG)-level, determined by the type of resource allocation in use. However, even when the allocation is defined with RE-level precision, the use of FMCW with a single RE offset can lead to ambiguities in range and Doppler measurements. This is particularly the case if the FMCW is produced using an analog VCO, where the starting frequency might be randomly selected.

The technical solutions disclosed herein provide higher resolution resource allocation schemes beyond the RE-level for the sensing and/or the JCS, where the REs configured for the RF sensing are by quantized for generating the FMCW signals. This enhancement can further increase the efficiency of the JCS.

Figure 5:
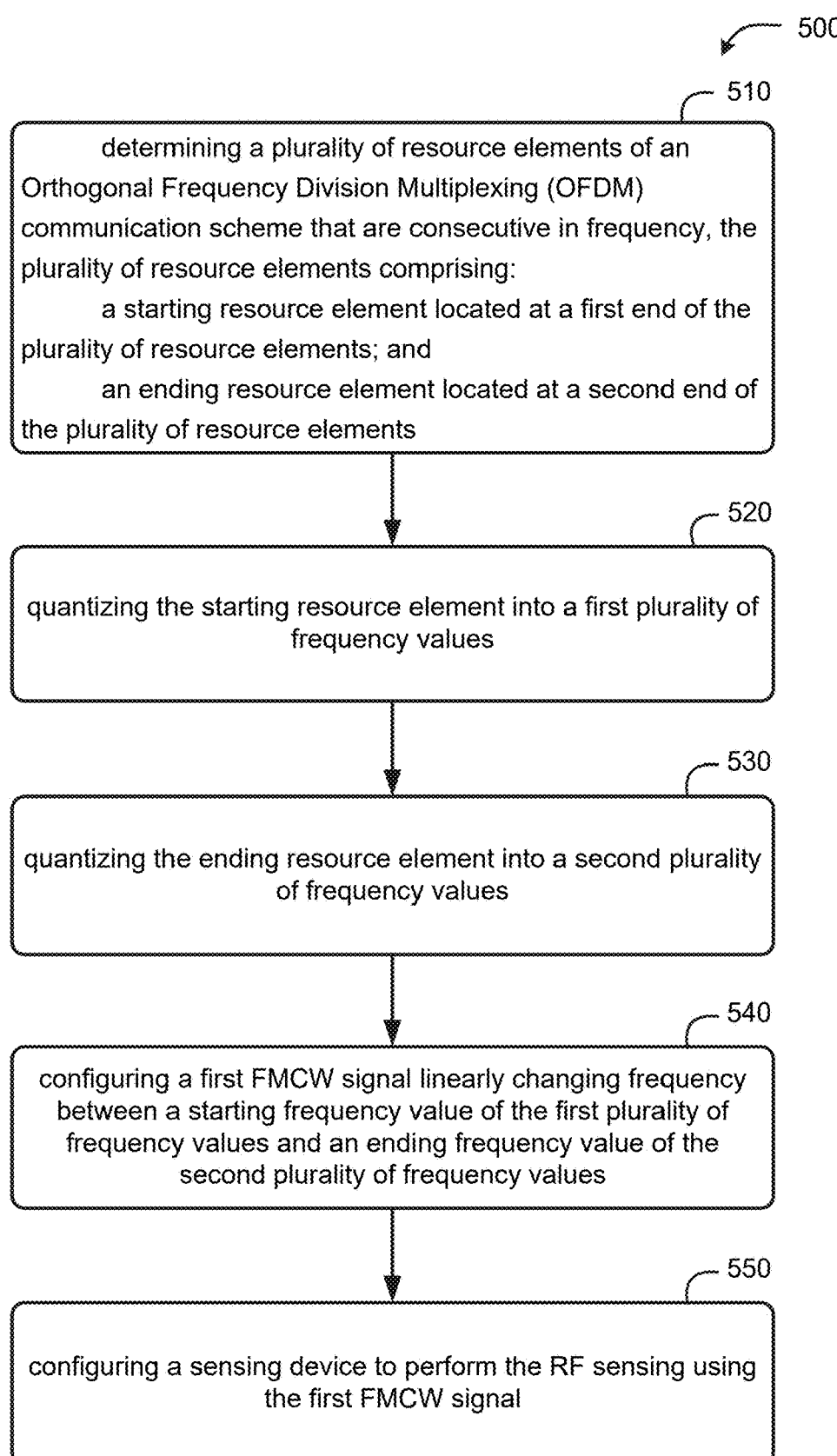
FIG. 5 is a flow diagram of a method of RF sensing using FMCW signals, performed by a configuring device, according to some embodiments.

For example, FIG. 5 is a flow diagram of a method 500 of RF sensing using FMCW signals, performed by a configuring device, according to some embodiments. For ease of illustration, FIG. 5 will be disclosed together with FIGS. 6, 7A-7D, and 8A-8C. The configuring device may correspond to a base station or other network device (e.g., a base station 120 in FIG. 1, a gNB 210 in FIG. 2, and/or a base station 310 in FIG. 3). Means for performing the functionality illustrated in one or more of the blocks shown in FIG. 5 may be performed by hardware and/or software components of a base station. Example components of a base station are illustrated in FIG. 10, which is described in more detail below.

Figure 6:
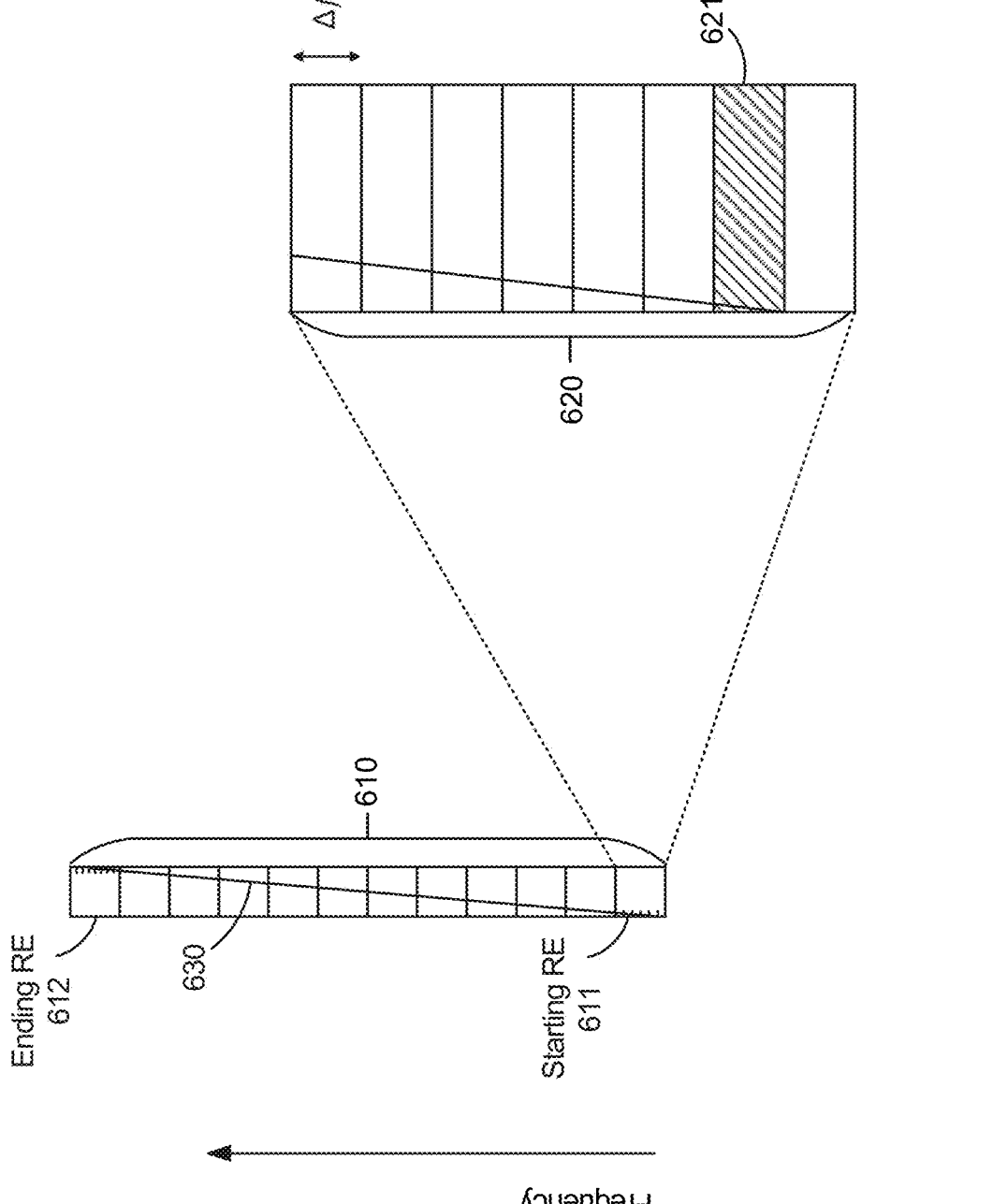
FIG. 6 is a diagram showing an example FMCW signal configuration, according to some embodiments.

At block 510, the method 500 may comprise determining a plurality of REs of a wireless communication scheme (e.g., an OFDM communication scheme) that are consecutive in frequency. The plurality of REs may include a starting resource element located at a first end of the plurality of resource elements and an ending resource element located at a second end of the plurality of resource elements. For example, FIG. 6 is a diagram showing an example FMCW signal configuration, according to some embodiments. As shown in FIG. 6, when configuring the FMCW signals for sensing, a plurality of REs of an OFDM communication scheme 610 (referred as "the plurality of REs 610" hereinafter) that are consecutive in frequency may be determined. The plurality of REs 610 may include a starting RE 611 and an ending RE 612, located at the respective ends of the bandwidth the plurality of REs 610 span.

Figure 10:
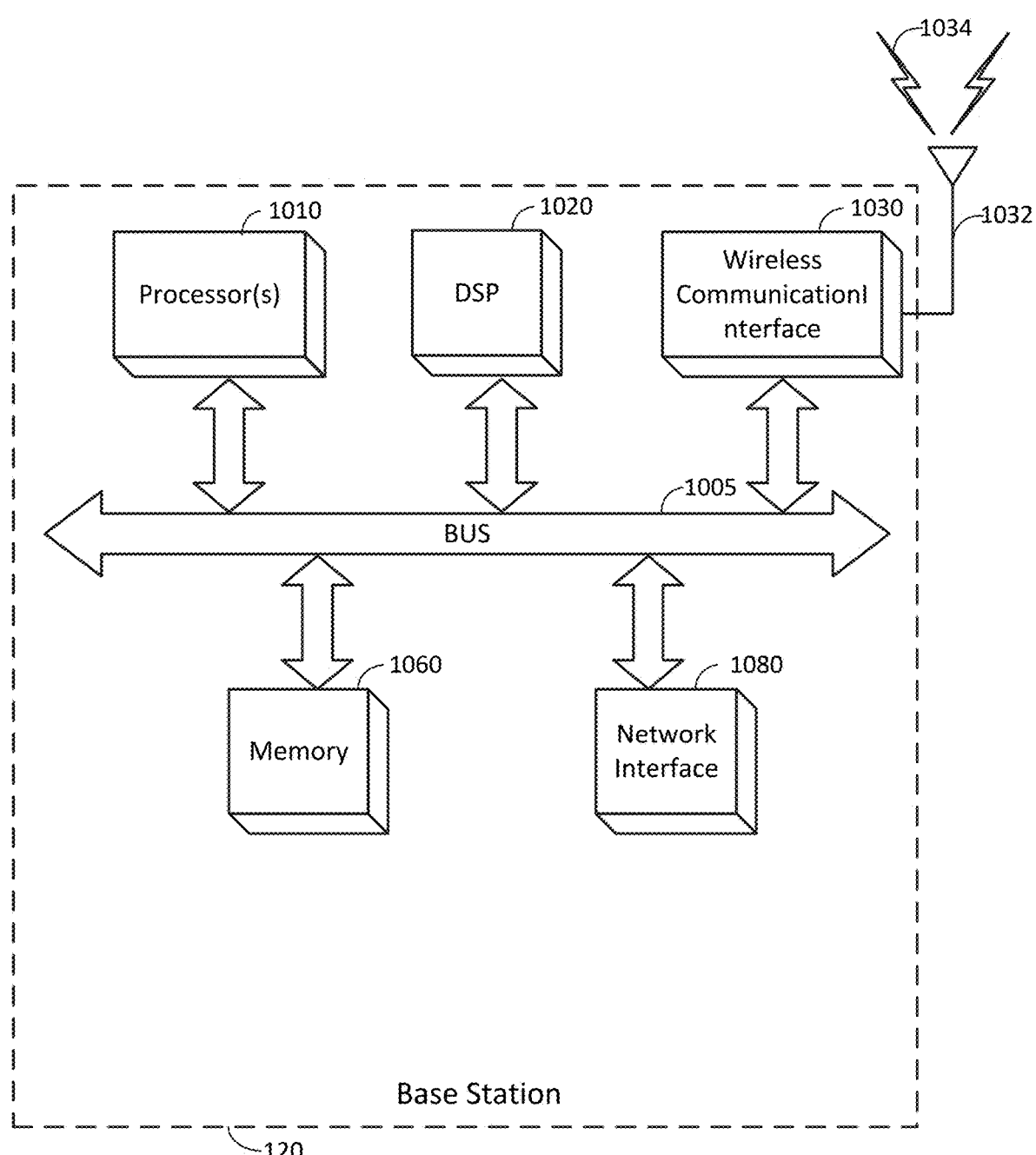
FIG. 10 is a block diagram of an embodiment of a base station, which can be utilized in embodiments as described herein.

Means for performing functionality at block 510 may comprise bus 1005, processor(s) 1010, wireless communication interface 1030, sensors 1040, memory 1060, GNSS receiver 1080, and/or other components of a base station, such as those as illustrated in FIG. 10 and described hereafter.

At block 520, the method 500 may comprise quantizing the starting resource element into a first plurality of frequency values. For example, as shown in FIG. 6, the starting RE 611 and the ending RE 612 may each be quantized into a plurality of frequency values. For example, the starting RE 611 may be quantized into a first plurality of frequency values 620, spaced by $\Delta_f$. The frequency spacing $\Delta_f$ may be of any appropriate such that it is less than or equal to the Doppler frequency resolution of the desired sensing results, namely, $$\Delta_f \le \frac{1}{2NT_c}.$$

In some embodiments, the first plurality of frequency values may include three values: an upper frequency, a center frequency, and a lower frequency, where the frequency spacing $\Delta_f$ equals half the subcarrier spacing of the starting resource element.

Means for performing functionality at block 520 may comprise bus 1005, processor(s) 1010, wireless communication interface 1030, sensors 1040, memory 1060, GNSS receiver 1080, and/or other components of a base station, such as those as illustrated in FIG. 10 and described hereafter.

At block 530, the method 500 may comprise quantizing the ending resource element into a second plurality of frequency values. Similar to the operations performed at block 520, the ending RE 612 may be quantized into a second plurality of frequency values spaced by either the same or a different $\Delta_f$ compared to the starting RE 611. That said, the starting RE 611 and the ending RE 612 may be quantized according to the same or different frequency spacing patterns. Therefore, the first plurality of frequency values 620 for the starting RE 611 may include the same or a different number of frequency values compared to the second plurality of frequency values for the ending RE 612.

In some embodiments, similar to the first plurality of frequency values quantizing the starting resource element, the second plurality of frequency values may also include three values: an upper frequency, a center frequency, and a lower frequency, where the $\Delta_f$ equals half the subcarrier spacing of the ending resource element.

Means for performing functionality at block 530 may comprise bus 1005, processor(s) 1010, wireless communication interface 1030, sensors 1040, memory 1060, GNSS receiver 1080, and/or other components of a base station, such as those as illustrated in FIG. 10 and described hereafter.

At block 540, the method 500 may comprise determining a first configuration of a first FMCW signal such that the first FMCW signal linearly changes frequency between a starting frequency value of the first plurality of frequency values and an ending frequency value of the second plurality of frequency values. For example, as shown in FIG. 6, a starting frequency value 621 may be selected from the first plurality of frequency values 620. An ending frequency value may be selected from the second plurality of frequency values. According to the first configuration, a FMCW signal 630 linearly changing frequency from the starting frequency value 621 of the starting RE 611 to the ending frequency value of the ending RE 612, may be configured. In some embodiments, in situations where the starting resource element and the ending resource element are both quantized into the upper frequency, the center frequency, and the lower frequency, the starting frequency value may be limited to one of the upper frequency, the center frequency, and the lower frequency of the starting resource element and the ending frequency value may be limited to one of the upper frequency, the center frequency, and the lower frequency of the ending resource element.

Means for performing functionality at block 540 may comprise bus 1005, processor(s) 1010, wireless communication interface 1030, sensors 1040, memory 1060, GNSS receiver 1080, and/or other components of a base station, such as those as illustrated in FIG. 10 and described hereafter.

At block 550, the method 500 may comprise transmitting a configuration message indicating the first configuration. For example, a RF sensing configuration indicating the FMCW configuration (e.g., the first configuration) may be transmitted from the configuring device to the sensing device. Specifically, the RF sensing configuration may indicate parameters including at least the frequency spacing $\Delta_f$, which starting value and/or ending value are selected. In situations where both the starting and ending resource elements are quantized into the upper frequency, the center frequency, and the lower frequency, the RF sensing configuration can indicate (e.g., using two bits of binary data in a control signal) which frequency value among the upper, center, and lower frequencies of the starting and ending resource elements are selected as the starting and/or ending frequency values. Configuring the FMCW signal in this manner can significantly reduce control signaling overhead.

Means for performing functionality at block 550 may comprise bus 1005, processor(s) 1010, wireless communication interface 1030, sensors 1040, memory 1060, GNSS receiver 1080, and/or other components of a base station, such as those as illustrated in FIG. 10 and described hereafter.

In some embodiments, the frequency spacing $\Delta_f$ in the first and the second plurality of frequency values may be independent of a subcarrier spacing of the plurality of REs 610. That said, REs with different subcarrier spacings may be quantized into the same frequency spacing $\Delta_f$. For example, a RE with 60 kHz subcarrier spacing may be quantized to have the same frequency spacing $\Delta_f$ as a RE with 120 kHz subcarrier spacing.

Additionally or alternatively, the frequency spacing $\Delta_f$ in the first and second sets of frequency values may depend on the subcarrier spacing of the REs 610. REs with different subcarrier spacings may be quantized according to the same frequency spacing pattern. For example, an RE with a 60 kHz subcarrier spacing may be quantized into the same number of frequency values as an RE with a 120 kHz subcarrier spacing.

In some embodiments, the first configuration indicates at least: the frequency spacing $\Delta_f$ between different frequency values within the first plurality of frequency values 620; the frequency spacing $\Delta_f$ between different frequency values within the second plurality of frequency values; the starting frequency value 611; and the ending frequency value 612.

Figures 7A, 7B, 7C, 7D:
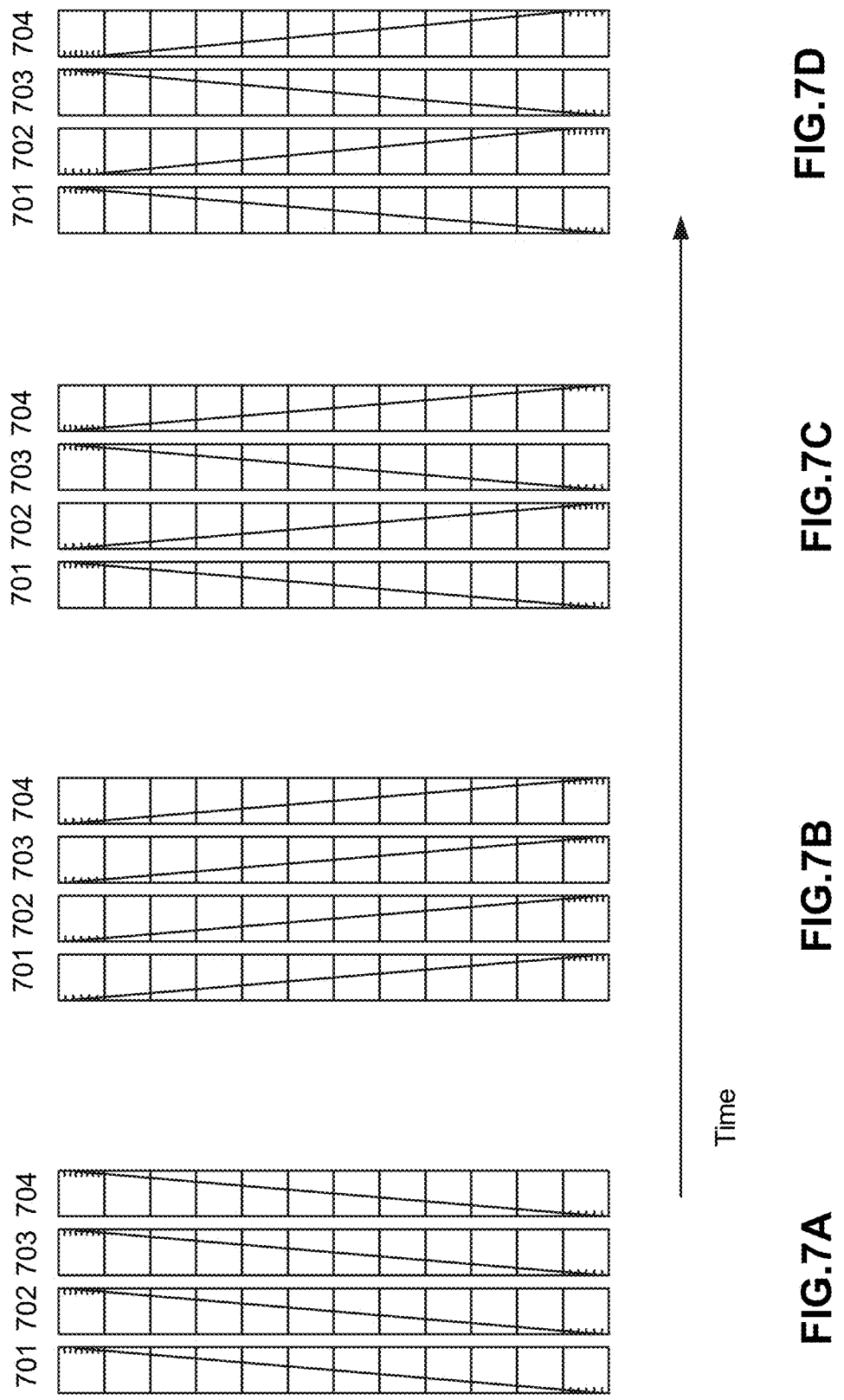
FIGS. 7A-7D are diagrams showing example FMCW signal configurations across different symbols, according to some embodiments.

In some embodiments, the RF sensing configuration may indicate FMCW transmission patterns across more than one symbol. For example, FIGS. 7A-7D are diagrams showing example FMCW signal configurations across different symbols, according to some embodiments. As shown in FIGS. 7A-7D, across the four symbols consecutive in time (e.g., symbols 701, 702, 703, and 704), the frequency of the FMCW signal may be all ramping up (e.g., as shown in FIG. 7A), all ramping down (e.g., as shown in FIG. 7B), alternately ramping up and down with the same starting and ending frequency values (e.g., as shown in FIG. 7C), and/or alternately ramping up and down with different starting and ending frequency values (e.g., as shown in FIG. 7D). It is understood that the multi-symbol FMCW transmission patterns discussed herein are for illustrative purposes only. Any other suitable patterns may be applied. Also, the number of symbols the FMCW transmission pattern may extend across is not limited to what is shown in FIGS. 7A-7D. The FMCW signal configurations may extend across any suitable number of symbols, depending on the desired performance.

In some embodiments, the RF sensing configuration may indicate the same starting frequency value, the same ending frequency value, and/or the same number of total RE/RB/RBG (e.g., the number of REs in the plurality of REs 610) for multiple ports/antennas to reduce signaling overhead. Additionally or alternatively, the RF sensing configuration may indicate different starting frequency values, ending frequency values, and/or numbers of total RE/RB/RBG for different ports/antennas.

In some embodiments, the method 500 may further comprise transmitting the configuration message based on Radio Resource Control or Medium Access Control-Control Element.

In some embodiments, the the first configuration is dynamically determined based on Medium Access Control—Control Element or Downlink Control Information.

Figure 8C:
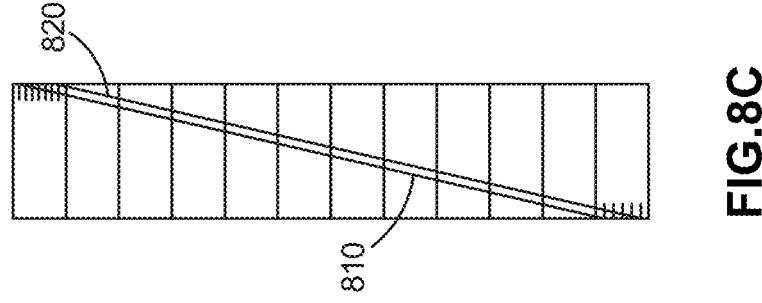
FIGS. 8A-8C are diagrams showing example FMCW signal configurations for more than one FMCW signals sharing the same set of resource elements, according to some embodiments.
Figure 8B:
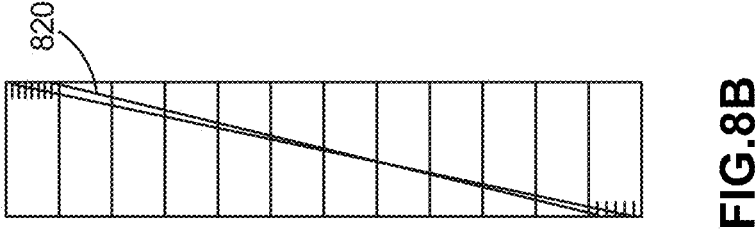
Figure 8A:
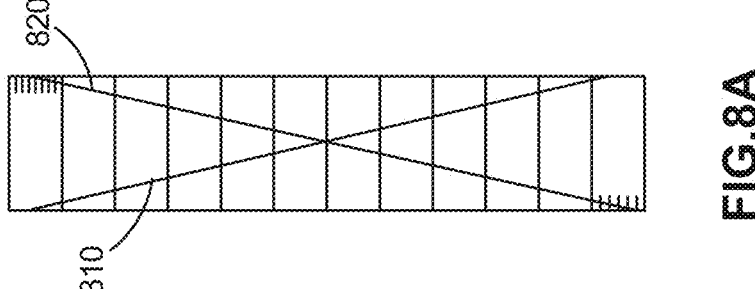

In some embodiments, the method 500 may further comprise determining a second configuration for a second FMCW signal concurrently sharing the plurality of resource elements with the first FMCW signal, wherein the second FMCW signal has: a starting frequency value different from the starting frequency value of the first FMCW signal, an ending frequency value different from the ending frequency value of the first FMCW signal, or both. For example, FIGS. 8A-8C are diagrams showing example FMCW signal configurations for more than one FMCW signals sharing the same set of resource elements, according to some embodiments. In some embodiments, the frequency of the FMCW signals 810 and 820 may be ramping in different directions.

For example, as shown in FIG. 8A, the frequency of the FMCW signal 810 may ramp up while the frequency of the FMCW signal 820 may ramp down. In some other embodiments, the FMCW signals 810 and 820 may ramp in the same direction but with different starting and/or ending frequency value and different ramping slopes. For example, as shown in FIG. 8B, the starting frequency value of the FMCW signal 810 may be higher than the starting frequency value of FMCW signals 820, and the ending frequency value of the FMCW signal 810 may be lower than the ending frequency value of FMCW signals 820. Additionally or alternatively, the FMCW signals 810 and 820 may ramp in the same direction and with the same slope, but with different starting and/or ending frequency values. For example, as shown in FIG. 8C, the starting RE for FMCW signals 810 and 820 may be quantized according to the same frequency pattern, and the ending RE for FMCW signals 810 and 820 may also be quantized according to the same frequency pattern. The starting frequency values of FMCW signals 810 and 820 may have different offsets within the same set of frequency values of the starting RE, and the ending frequency values of FMCW signals 810 and 820 may have different offsets within the same set of frequency values of the ending RE. The difference in the starting frequency value offsets may be the same as the difference in the ending frequency value offsets for FMCW signals 810 and 820. In some embodiments, the FMCW signals 810 and 820 may be configured for different RF sensing ports.

Figure 11:
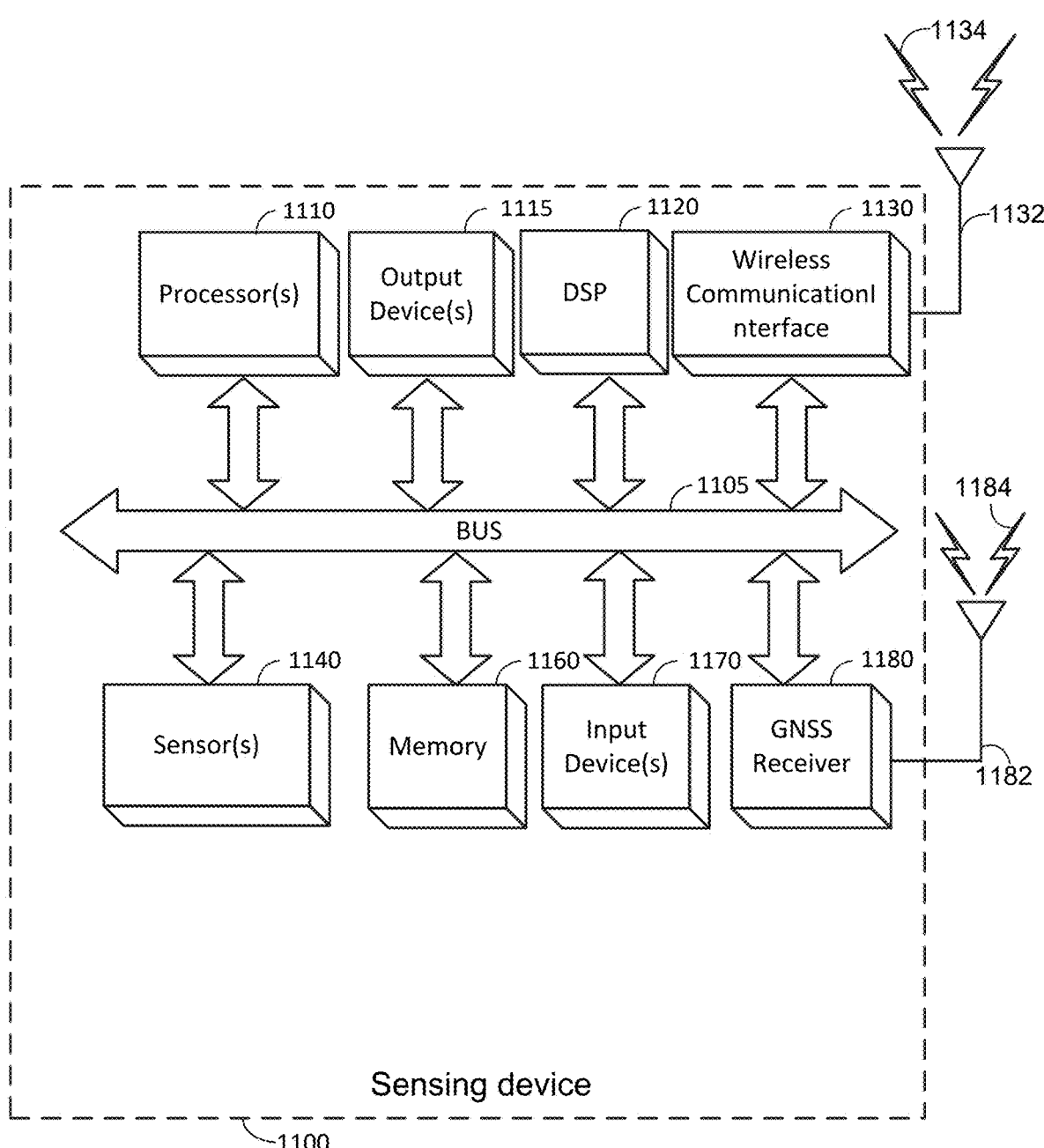
FIG. 11 is a block diagram of an embodiment of a UE, which can be utilized in embodiments as described herein.

FIG. 9 is a flow diagram of a method 900 of RF sensing using FMCW signals, performed by a sensing device, according to some embodiments. The sensing device may correspond to a sensing device (e.g., a mobile device 105 in FIGS. 1 and 3, and/or a UE 205 in FIG. 2). Means for performing the functionality illustrated in one or more of the blocks shown in FIG. 9 may be performed by hardware and/or software components of a base station. Example components of a sensing device are illustrated in FIG. 11, which is described in more detail below. In some embodiments, the sensing device may receive the RF sensing configuration indicating the FMCW configuration from the configuring device and may perform method 900 according to the RF sensing configuration. For ease of illustration, the operations in method 900 that are similar to the corresponding operations in method 800 will not be discussed in detail.

At block 910, the method 900 may comprise obtaining a first configuration for a first FMCW signal, wherein according to the first configuration, the first FMCW signal extends across a plurality of resource elements of a wireless communication scheme that are consecutive in frequency, the plurality of resource elements comprising: a starting resource element located at a first end of the plurality of resource elements; and an ending resource element located at a second end of the plurality of resource elements, wherein the starting resource element is quantized into a first plurality of frequency values, the ending resource element is quantized into a second plurality of frequency values, and the first FMCW signal linearly changes frequency between a starting frequency value of the first plurality of frequency values and an ending frequency value of the second plurality of frequency values.

Means for performing functionality at block 910 may also comprise bus 1105, processor(s) 1110, wireless communication interface 1130, sensors 1140, memory 1160, GNSS receiver 1180, and/or other components of a sensing device, such as those as illustrated in FIG. 11 and described hereafter.

At block 920, the method 900 may comprise performing the RF sensing according to the first configuration.

Means for performing functionality at block 920 may also comprise bus 1105, processor(s) 1110, wireless communication interface 1130, sensors 1140, memory 1160, GNSS receiver 1180, and/or other components of a sensing device, such as those as illustrated in FIG. 11 and described hereafter.

FIG. 10 is a block diagram of an embodiment of a base station 120, which can be utilized as described herein above (e.g., in association with a base station 120 in FIG. 1, a gNB 210 in FIG. 2, a base station 310 in FIG. 3, a configuring device in FIGS. 5 and/or 9). For example, the base station 120 can perform one or more of the functions of the method shown in FIG. 5. It should be noted that FIG. 10 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 1005 (or may otherwise be in communication, as appropriate). The hardware elements may include a processor(s) 1010 which can include without limitation one or more general-purpose processors, one or more special-purpose processors (such as DSP chips, graphics acceleration processors, ASICs, and/or the like), and/or other processing structure or means. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1030 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 1034.

The base station 120 may also include a network interface 1080, which can include support of wireline communication technologies. The network interface 1080 may include a modem, network card, chipset, and/or the like. The network interface 1080 may include one or more input and/or output communication interfaces to permit data to be exchanged with a network, communication network servers, computer systems, and/or any other electronic devices described herein.

In many embodiments, the base station 120 may further comprise a memory 1060. The memory 1060 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1060 of the base station 120 also may comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the base station 120 (and/or processor(s) 1010 or DSP 1020 within base station 120). In some embodiments, then, such code and/or instructions can be used to configure and/or adapt a general-purpose computer (or other device) to perform one or more operations in accordance with the described methods.

FIG. 11 is a block diagram of an embodiment of a sensing device 1100, which can be utilized as described herein above (e.g., in association with a mobile device 105 in FIGS. 1 and 3, UE 205 in FIG. 2, a sensing device in FIGS. 5 and/or 9). For example, the sensing device 1100 can perform one or more of the functions of the method shown in FIG. 9, in cases in which the configuring device corresponds to a sensing device and in cases in which the configuring device corresponds to a base station. It should be noted that FIG. 11 is meant only to provide a generalized illustration of various components, any or all of which may be utilized as appropriate. It can be noted that, in some instances, components illustrated by FIG. 11 can be localized to a single physical device and/or distributed among various networked devices, which may be disposed at different physical locations. Furthermore, as previously noted, the functionality of the sensing device discussed in the previously described embodiments may be executed by one or more of the hardware and/or software components illustrated in FIG. 11.

The sensing device 1100 is shown comprising hardware elements that can be electrically coupled via a bus 1105 (or may otherwise be in communication, as appropriate). The hardware elements may include a processor(s) 1110 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1110 may comprise one or more processing units, which may be housed in a single integrated circuit (IC) or multiple ICs. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below). The sensing device 1100 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The sensing device 1100 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the sensing device 1100 to communicate with other devices as described in the embodiments above. The wireless communication interface 1130 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof. The antenna(s) 1132 may be capable of transmitting and receiving wireless signals using beams (e.g., Tx beams and Rx beams). Beam formation may be performed using digital and/or analog beam formation techniques, with respective digital and/or analog circuitry. The wireless communication interface 1130 may include such circuitry.

Depending on desired functionality, the wireless communication interface 1130 may comprise a separate receiver and transmitter, or any combination of transceivers, transmitters, and/or receivers to communicate with base stations (e.g., ng-eNBs and gNBs) and other terrestrial transceivers, such as wireless devices and access points. The sensing device 1100 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The sensing device 1100 can further include sensor(s) 1140. Sensor(s) 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the sensing device 1100 may also include a Global Navigation Satellite System (GNSS) receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the sensing device 1100, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1180 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1180 is illustrated in FIG. 11 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1110, DSP 1120, and/or a processor within the wireless communication interface 1130 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1110 or DSP 1120.

The sensing device 1100 may further include and/or be in communication with a memory 1160. The memory 1160 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the sensing device 1100 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the sensing device 1100 (and/or processor(s) 1110 or DSP 1120 within sensing device 1100). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. An example method for radio frequency (RF) sensing using Frequency-Modulated Continuous-Wave (FMCW) signals performed by a configuring device, the method may comprise determining a plurality of resource elements of a wireless communication scheme that are consecutive in frequency. The plurality of resource elements may comprise a starting resource element located at a first end of the plurality of resource elements and an ending resource element located at a second end of the plurality of resource elements. The method may also comprise quantizing the starting resource element into a first plurality of frequency values and quantizing the ending resource element into a second plurality of frequency values. The method may further comprise determining a first configuration of a first FMCW signal such that the first FMCW signal linearly changes frequency between a starting frequency value of the first plurality of frequency values and an ending frequency value of the second plurality of frequency values and transmitting a configuration message indicating the first configuration.

Clause 2. The method of clause 1, wherein the first plurality of frequency values and the second plurality of frequency values are configured in accordance with a same frequency spacing pattern.

Clause 3. The method of clause 1 or 2, wherein a frequency spacing in the first plurality of frequency values and the second plurality of frequency values is independent of a subcarrier spacing of the plurality of resource elements.

Clause 4. The method of any of clauses 1-3, wherein a frequency spacing in the first plurality of frequency values and the second plurality of frequency values is dependent on a subcarrier spacing of the plurality of resource elements.

Clause 5. The method of any of clauses 1-4, wherein the first configuration:
  determining a RF sensing configuration indicating indicates at least: a
  frequency spacing between different frequency values within the first plurality of frequency values; a frequency spacing between different frequency values within the second plurality of frequency values; the starting frequency value; and the ending frequency value.

Clause 6. The method of any of clauses 1-5, further comprising: transmitting the configuration message based on Radio Resource Control or Medium Access Control—Control Element.

Clause 7. The method of any clauses 1-6, wherein the first configuration is dynamically determined based on Medium Access Control—Control Element or Downlink Control Information.

Clause 8. The method of any of clauses 1-7, further comprising: determining a second configuration for a second FMCW signal concurrently sharing the plurality of resource elements with the first FMCW signal, wherein the second FMCW signal has: a starting frequency value different from the starting frequency value of the first FMCW signal, an ending frequency value different from the ending frequency value of the first FMCW signal, or both.

Clause 9. The method of any of clauses 1-8, wherein the first FMCW signal and the second FMCW signal are configured for different RF sensing ports.

Clause 10. The method of any of clauses 1-9, wherein the first plurality of frequency values includes an upper frequency, a center frequency, and a lower frequency, and wherein a frequency spacing between the upper frequency, the center frequency, and the lower frequency equals one half a subcarrier spacing of the starting resource element.

Clause 11. The method of any of clauses 1-10, further comprising: determining a RF sensing configuration indicating which one of the upper frequency, the center frequency, and the lower frequency is selected as the starting frequency value using two bits of binary data in a control signal.

Clause 12. An example method for radio frequency (RF) sensing using Frequency-Modulated Continuous-Wave (FMCW) signals performed by a sensing device, the method may comprise obtaining a first configuration for a first FMCW signal, wherein according to the first configuration, the first FMCW signal extends across a plurality of resource elements of a wireless communication scheme that are consecutive in frequency. The plurality of resource elements may comprise a starting resource element located at a first end of the plurality of resource elements and an ending resource element located at a second end of the plurality of resource elements. The starting resource element may be quantized into a first plurality of frequency values, the ending resource element may be quantized into a second plurality of frequency values, and the first FMCW signal may linearly change frequency between a starting frequency value of the first plurality of frequency values and an ending frequency value of the second plurality of frequency values. The method may further comprise performing the RF sensing according to the first configuration.

Clause 13. The method of clause 12, wherein the first plurality of frequency values and the second plurality of frequency values are configured in accordance with a same frequency spacing pattern.

Clause 14. The method of clause 12 or 13, wherein a frequency spacing in the first plurality of frequency values and the second plurality of frequency values is independent of a subcarrier spacing of the plurality of resource elements.

Clause 15. The method of any of clauses 12-14, wherein a frequency spacing in the first plurality of frequency values and the second plurality of frequency values is dependent on a subcarrier spacing of the plurality of resource elements.

Clause 16. The method of any of clauses 12-15, wherein the first configuration indicating at least: a frequency spacing between different frequency values within the first plurality of frequency values; a frequency spacing between different frequency values within the second plurality of frequency values; the starting frequency value; and the ending frequency value.

Clause 17. An example configuring device for integrated sensing and communication may comprise one or more transceivers, one or more memories, and one or more processors communicatively coupled with the one or more transceivers and the one or more memories. The one or more processors may be configured to determine a plurality of resource elements of a wireless communication scheme that are consecutive in frequency. The plurality of resource elements may comprise a starting resource element located at a first end of the plurality of resource elements and an ending resource element located at a second end of the plurality of resource elements. The one or more processors may further be configured to quantize the starting resource element into a first plurality of frequency values and quantize the ending resource element into a second plurality of frequency values. The one or more processors may also be configured to determine a first configuration of a first FMCW signal such that the first FMCW signal linearly changes frequency between a starting frequency value of the first plurality of frequency values and an ending frequency value of the second plurality of frequency values, and transmit a configuration message indicating the first configuration.

Clause 18. The configuring device of clause 17, wherein the first plurality of frequency values and the second plurality of frequency values are configured in accordance with a same frequency spacing pattern.

Clause 19. The configuring device of clause 17 or 18, wherein a frequency spacing in the first plurality of frequency values and the second plurality of frequency values is independent of a subcarrier spacing of the plurality of resource elements.

Clause 20. The configuring device of any of clauses 17-19, wherein a frequency spacing in the first plurality of frequency values and the second plurality of frequency values is dependent on a subcarrier spacing of the plurality of resource elements.

Clause 21. The configuring device of any of clauses 17-20, wherein the first configuration indicates at least: a frequency spacing between different frequency values within the first plurality of frequency values; a frequency spacing between different frequency values within the second plurality of frequency values; the starting frequency value; and the ending frequency value.

Clause 22. The configuring device of any of clauses 17-21, wherein the one or more processors are further configured to: transmit the configuration message based on Radio Resource Control or Medium Access Control—Control Element.

Clause 23. The configuring device of any of clauses 17-22, wherein the first configuration is dynamically determined based on Medium Access Control-Control Element or Downlink Control Information.

Clause 24. The configuring device of any of clauses 17-23, the one or more processors are further configured to: determine a second configuration for a second FMCW signal concurrently sharing the plurality of resource elements with the first FMCW signal, wherein the second FMCW signal has: a starting frequency value different from the starting frequency value of the first FMCW signal, an ending frequency value different from the ending frequency value of the first FMCW signal, or both.

Clause 25. The configuring device of any of clauses 17-24, wherein the first FMCW signal and the second FMCW signal are configured for different RF sensing ports.

Clause 26. The configuring device of any of clauses 17-25, wherein the first plurality of frequency values includes an upper frequency, a center frequency, and a lower frequency, and wherein a frequency spacing between the upper frequency, the center frequency, and the lower frequency equals one half a subcarrier spacing of the starting resource element.

Clause 27. The configuring device of any of clauses 17-26, the one or more processors are further configured to: determine a RF sensing configuration indicating which one of the upper frequency, the center frequency, and the lower frequency is selected as the starting frequency value using two bits of binary data in a control signal.

Clause 28. An example sensing device for integrated sensing and communication may comprise one or more transceivers, one or more memories, and one or more processors communicatively coupled with the one or more transceivers and the one or more memories. The one or more processors may be configured to obtain a first configuration for a first FMCW signal, wherein according to the first configuration, the first FMCW signal extends across a plurality of resource elements of a wireless communication scheme that are consecutive in frequency. The plurality of resource elements may comprise a starting resource element located at a first end of the plurality of resource elements and an ending resource element located at a second end of the plurality of resource elements. The starting resource element is quantized into a first plurality of frequency values, the ending resource element is quantized into a second plurality of frequency values, and the first FMCW signal linearly changes frequency between a starting frequency value of the first plurality of frequency values and an ending frequency value of the second plurality of frequency values. The one or more processors may further be configured to perform the RF sensing according to the first configuration.

Clause 29. The sensing device of clause 28, wherein the first plurality of frequency values and the second plurality of frequency values are configured in accordance with a same frequency spacing pattern.

Clause 30. The sensing device of clause 28 or 29, wherein a frequency spacing in the first plurality of frequency values and the second plurality of frequency values is independent of a subcarrier spacing of the plurality of resource elements.

What is claimed is:

1. A method for radio frequency (RF) sensing using Frequency-Modulated Continuous-Wave (FMCW) signals performed by a configuring device, the method comprising:

determining a plurality of resource elements of a wireless communication scheme that are consecutive in frequency, the plurality of resource elements comprising:
a starting resource element located at a first end of the plurality of resource elements; and
an ending resource element located at a second end of the plurality of resource elements;
quantizing the starting resource element into a first plurality of frequency values;
quantizing the ending resource element into a second plurality of frequency values;
determining a first configuration of a first FMCW signal such that the first FMCW signal linearly changes frequency between a starting frequency value of the first plurality of frequency values and an ending frequency value of the second plurality of frequency values; and
transmitting a configuration message indicating the first configuration.

2. The method of claim 1, wherein the first plurality of frequency values and the second plurality of frequency values are configured in accordance with a same frequency spacing pattern.

3. The method of claim 1, wherein a frequency spacing in the first plurality of frequency values and the second plurality of frequency values is independent of a subcarrier spacing of the plurality of resource elements.

4. The method of claim 1, wherein a frequency spacing in the first plurality of frequency values and the second plurality of frequency values is dependent on a subcarrier spacing of the plurality of resource elements.

5. The method of claim 1, wherein the first configuration indicates at least:
a frequency spacing between different frequency values within the first plurality of frequency values;
a frequency spacing between different frequency values within the second plurality of frequency values;
the starting frequency value; and
the ending frequency value.

6. The method of claim 1, further comprising:
transmitting the configuration message based on Radio Resource Control or Medium Access Control—Control Element.

7. The method of claim 1, wherein the first configuration is dynamically determined based on Medium Access Control-Control Element or Downlink Control Information.

8. The method of claim 1, further comprising:
determining a second configuration for a second FMCW signal concurrently sharing the plurality of resource elements with the first FMCW signal, wherein the second FMCW signal has: a starting frequency value different from the starting frequency value of the first FMCW signal, an ending frequency value different from the ending frequency value of the first FMCW signal, or both.

9. The method of claim 8, wherein the first FMCW signal and the second FMCW signal are configured for different RF sensing ports.

10. The method of claim 1, wherein the first plurality of frequency values includes an upper frequency, a center frequency, and a lower frequency, and wherein a frequency spacing between the upper frequency, the center frequency, and the lower frequency equals one half a subcarrier spacing of the starting resource element.

11. The method of claim 10, further comprising:
determining a RF sensing configuration indicating which one of the upper frequency, the center frequency, and the lower frequency is selected as the starting frequency value using two bits of binary data in a control signal.

12. A method for radio frequency (RF) sensing using Frequency-Modulated Continuous-Wave (FMCW) signals performed by a sensing device, the method comprising:
obtaining a first configuration for a first FMCW signal, wherein according to the first configuration, the first FMCW signal extends across a plurality of resource elements of a wireless communication scheme that are consecutive in frequency, the plurality of resource elements comprising:
a starting resource element located at a first end of the plurality of resource elements; and
an ending resource element located at a second end of the plurality of resource elements, wherein the starting resource element is quantized into a first plurality of frequency values, the ending resource element is quantized into a second plurality of frequency values, and the first FMCW signal linearly changes frequency between a starting frequency value of the first plurality of frequency values and an ending frequency value of the second plurality of frequency values; and
performing the RF sensing according to the first configuration.

13. The method of claim 12, wherein the first plurality of frequency values and the second plurality of frequency values are configured in accordance with a same frequency spacing pattern.

14. The method of claim 12, wherein a frequency spacing in the first plurality of frequency values and the second plurality of frequency values is independent of a subcarrier spacing of the plurality of resource elements.

15. The method of claim 12, wherein a frequency spacing in the first plurality of frequency values and the second plurality of frequency values is dependent on a subcarrier spacing of the plurality of resource elements.

16. The method of claim 12, wherein the first configuration indicating at least:
a frequency spacing between different frequency values within the first plurality of frequency values;
a frequency spacing between different frequency values within the second plurality of frequency values;
the starting frequency value; and
the ending frequency value.

17. A configuring device for radio frequency (RF) sensing using Frequency-Modulated Continuous-Wave (FMCW) signals comprising:
one or more transceivers;
one or more memories; and
one or more processors communicatively coupled with the one or more transceivers and the one or more memories, wherein the one or more processors are configured to:
determine a plurality of resource elements of a wireless communication scheme that are consecutive in frequency, the plurality of resource elements comprising:
a starting resource element located at a first end of the plurality of resource elements; and
an ending resource element located at a second end of the plurality of resource elements;
quantize the starting resource element into a first plurality of frequency values;
quantize the ending resource element into a second plurality of frequency values;

determine a first configuration of a first FMCW signal such that the first FMCW signal linearly changes frequency between a starting frequency value of the first plurality of frequency values and an ending frequency value of the second plurality of frequency values; and
transmit a configuration message indicating the first configuration.

18. The configuring device of claim 17, wherein the first plurality of frequency values and the second plurality of frequency values are configured in accordance with a same frequency spacing pattern.

19. The configuring device of claim 17, wherein a frequency spacing in the first plurality of frequency values and the second plurality of frequency values is independent of a subcarrier spacing of the plurality of resource elements.

20. The configuring device of claim 17, wherein a frequency spacing in the first plurality of frequency values and the second plurality of frequency values is dependent on a subcarrier spacing of the plurality of resource elements.

21. The configuring device of claim 17, wherein the first configuration indicates at least:
a frequency spacing between different frequency values within the first plurality of frequency values;
a frequency spacing between different frequency values within the second plurality of frequency values;
the starting frequency value; and
the ending frequency value.

22. The configuring device of claim 17, wherein the one or more processors are further configured to:
transmit the configuration message based on Radio Resource Control or Medium Access Control-Control Element.

23. The configuring device of claim 17, wherein the first configuration is dynamically determined based on Medium Access Control-Control Element or Downlink Control Information.

24. The configuring device of claim 17, the one or more processors are further configured to:
determine a second configuration for a second FMCW signal concurrently sharing the plurality of resource elements with the first FMCW signal, wherein the second FMCW signal has: a starting frequency value different from the starting frequency value of the first FMCW signal, an ending frequency value different from the ending frequency value of the first FMCW signal, or both.

25. The configuring device of claim 24, wherein the first FMCW signal and the second FMCW signal are configured for different RF sensing ports.

26. The configuring device of claim 17, wherein the first plurality of frequency values includes an upper frequency, a center frequency, and a lower frequency, and wherein a frequency spacing between the upper frequency, the center frequency, and the lower frequency equals one half a subcarrier spacing of the starting resource element.

27. The configuring device of claim 26, the one or more processors are further configured to:
determine a RF sensing configuration indicating which one of the upper frequency, the center frequency, and the lower frequency is selected as the starting frequency value using two bits of binary data in a control signal.

28. A sensing device for radio frequency (RF) sensing using Frequency-Modulated Continuous-Wave (FMCW) signals comprising:
one or more transceivers;

one or more memories; and one or more processors communicatively coupled with the one or more transceivers and the one or more memories, wherein the one or more processors are configured to:

obtain a first configuration for a first FMCW signal, wherein according to the first configuration, the first FMCW signal extends across a plurality of resource elements of a wireless communication scheme that are consecutive in frequency, the plurality of resource elements comprising:

a starting resource element located at a first end of the plurality of resource elements; and an ending resource element located at a second end of the plurality of resource elements, wherein the starting resource element is quantized into a first plurality of frequency values, the ending resource element is quantized into a second plurality of frequency values, and the first FMCW signal linearly changes frequency between a starting frequency value of the first plurality of frequency values and an ending frequency value of the second plurality of frequency values; and perform the RF sensing according to the first configuration.

29. The sensing device of claim 28, wherein the first plurality of frequency values and the second plurality of frequency values are configured in accordance with a same frequency spacing pattern.

30. The sensing device of claim 28, wherein a frequency spacing in the first plurality of frequency values and the second plurality of frequency values is independent of a subcarrier spacing of the plurality of resource elements.

* * * * *